United States Patent [19]

Dooley et al.

[11] 4,303,211

[45] Dec. 1, 1981

[54] RADIO SYSTEMS AND APPARATUS

[75] Inventors: Graham C. Dooley, Tring; Alistair J. Dunlop, London, both of England

[73] Assignee: The Marconi Company Limited, England

[21] Appl. No.: 694,011

[22] Filed: Jun. 4, 1976

[30] Foreign Application Priority Data

Jun. 4, 1975 [GB] United Kingdom ............... 24177/75

[51] Int. Cl.³ ......................... F41G 7/00; F42B 15/02; G06F 15/50

[52] U.S. Cl. ...................................... 244/3.19; 343/872

[58] Field of Search ............... 343/114, 753, 754, 784, 343/785, 872, 7 ED; 102/70.2 P; 244/3.19

[56] References Cited

U.S. PATENT DOCUMENTS 3,316,549 4/1967 Hallendorff ......................... 343/872

3,940,767 2/1976 Delano et al. ...................... 343/872

*Primary Examiner*—Theodore M. Blum

*Attorney, Agent, or Firm*—Kirschstein, Kirschstein, Ottinger & Cobrin

[57] ABSTRACT

A radome aberration correction system in which data relating to the aberration over a range of angles of incident radar signals is stored in a digital data store. The apparent direction of a radar source is corrected by the addition of an aberration value stored in respect of the particular apparent source direction.

8 Claims, 2 Drawing Figures

RADIO SYSTEMS AND APPARATUS

Figure 1:
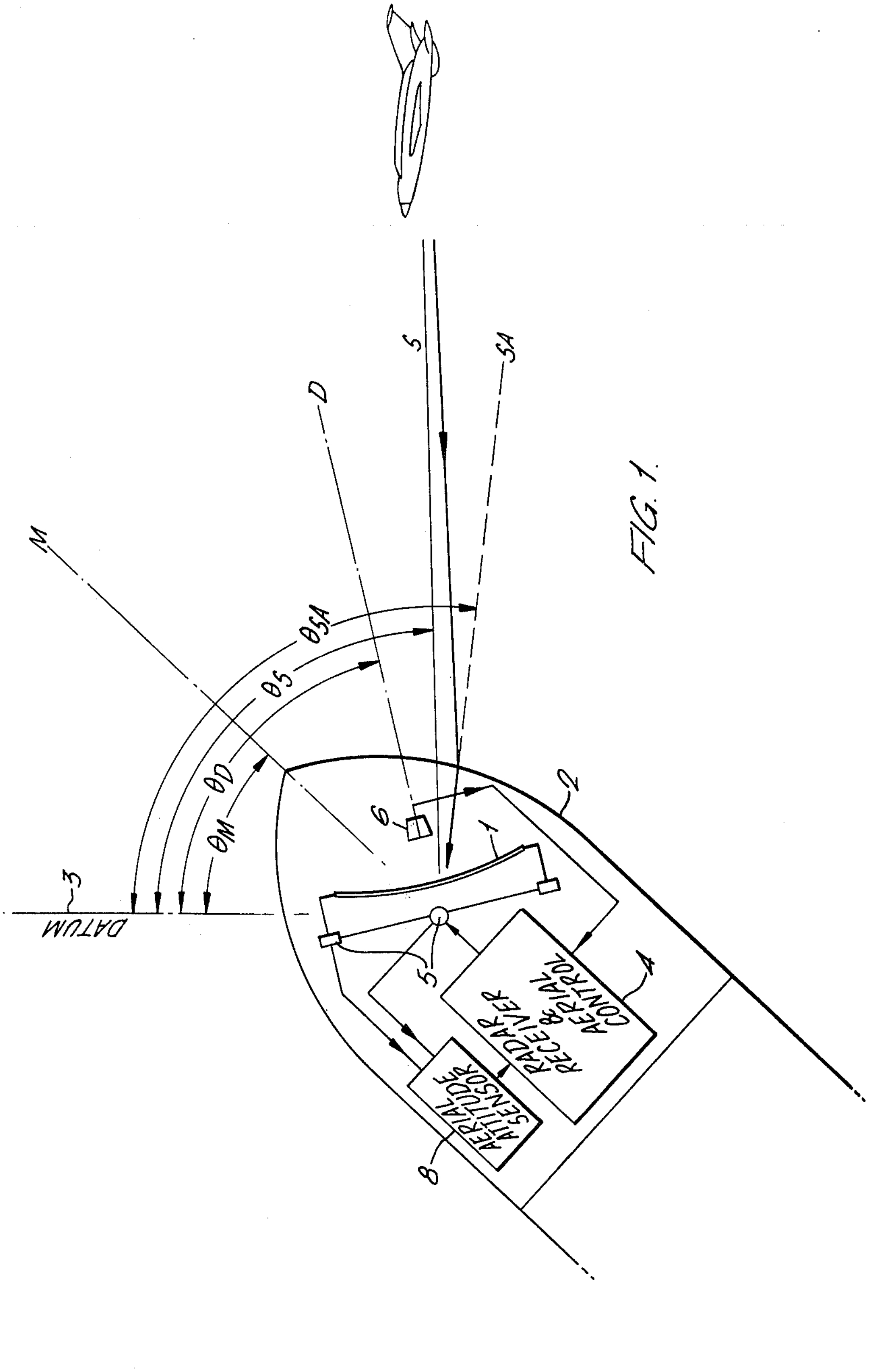

This invention relates to radio systems and apparatus. More particularly it is concerned with radome aberration correcting systems.

It is well known for a directional aerial system, for example in a radio homing head of a missile, to have an associated radome through which radio waves from a distant source have to pass before reaching the aerial system. A radome introduces aberration so that the apparent direction from which radio waves are received is not, in general, the actual direction of the source. Attempts have been made to reduce such aberration by careful choice of the radome geometry and/or by the provision of additional elements to compensate for any aberration.

One object of the present invention is to provide a system in which radome aberration is corrected in a quite different way.

According to the present invention, in a radome aberration correcting system having a directional aerial system and an associated radome, an addressable data store is arranged to store information in respect to the aberration to which radio waves received by the aerial system from different directions are subjected, there being means to address the data store in dependence upon the apparent direction of a source of radio waves received by the aerial system to derive the necessary aberration correction for adding to the apparent direction to give the true direction of said source.

Preferably the data store is a digital data store and may be a read-only memory (ROM) or a random access read/write memory (RAM).

According to a feature of the present invention, a radio homing head for a missile comprises a directional aerial system having an associated radome, an addressable digital data store which is arranged to store information in respect of the aberration to which radio waves received by the aerial system from different directions are subjected, and means to address the data store in dependence upon the apparent direction of a target from which radio waves are received by the aerial system to derive the necessary aberration correction for adding to the apparent direction to give the true direction of the target.

The aerial system may be mechanically steerable, and the homing head being arranged to supply a first electric signal characterising the angle in a fixed plane relative to the missile between the apparent direction of a target from which radio waves are received by the aerial system and the direction in which the aerial system is steered and a second electric signal characterising the angle in said plane between the direction in which the aerial system is steered and the longitudinal axis of the missile, there being means responsive to the first and second signals to derive a third electric signal which characterises the angle between the apparent direction of the target and said missile axis and which is utilised to address the data store and means responsive to the first signal and to a fourth signal which characterises the aberration correction read from the data store to derive an output signal which characterises the angle in said plane between the true direction of the target and the direction in which the aerial system is steered.

Preferably an analogue-to-digital converter is arranged to derive the signals actually used to address the data store from the third electric signal and a digital-to-analogue converter is arranged to derive an electric signal characterising the aberration correction from the information read from the data store. The data store may be a read-only memory (ROM) or a random access read/write memory (RAM).

Figure 2:
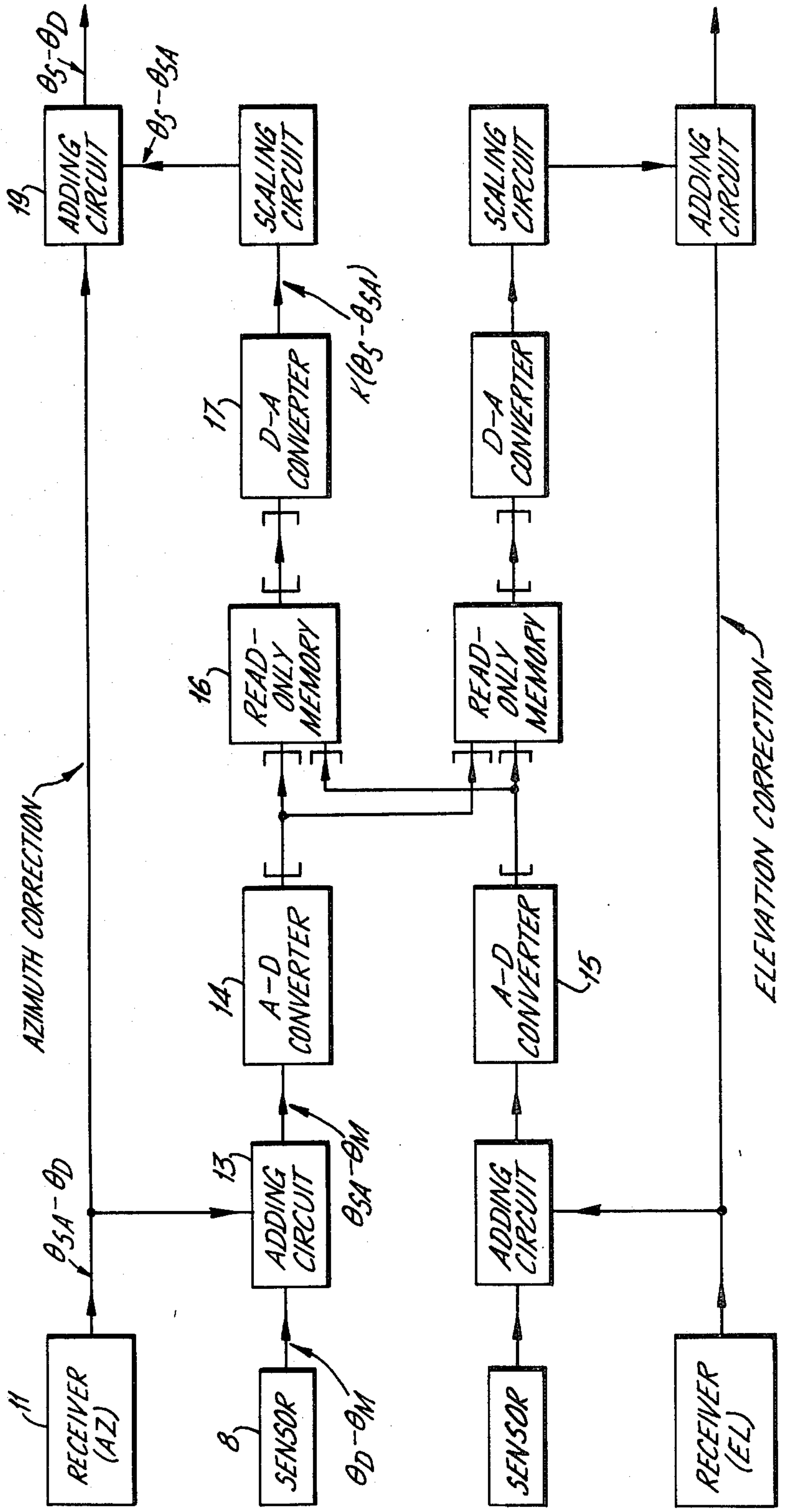

A radar homing head for a missile including a radome aberration correcting system in accordance with the present invention will now be described by way of example with reference to the accompanying drawings in which FIG. 1 shows the basic geometry involved, and FIG. 2 shows the aberration correcting system in diagrammatic form.

The radar homing head now to be considered forms part of a semi-active radar system (that is to say, one in which radio waves transmitted by a remote radar transmitter are reflected by a target and processed in a receiver in the homing head).

Referring first to FIG. 1, the homing head includes a directional aerial system comprising a paraboloidal reflector 1 and a monopulse array of primary elements 6 in known manner, located in the region of the focus of the reflector 1. The aerial system is steered under the control of the radar receiver 4 to tend to zero the boresight/target angle and so maximise the received signal in known manner. Target direction information for the radar receiver is provided by the monopulse array 6 in known manner, and this information is, of course, improved in reliability as the received signal is maximised. The aerial steering is controlled in two planes which are mutually at right angles and which are subsequently referred to as the azimuth plane and the elevation plane respectively. For this purpose the aerial system may be carried on the missile body by a gimbal mounting 5, shown diagrammatically. A radome 2 encloses the aerial system.

Within the homing head, angles in each of said two planes are measured from a spatially fixed datum and in FIG. 1 (which shows only one of the planes) this datum is represented by the line 3. Thus, in the relevant plane, $\theta_M$ is the angle between the datum 3 and the longitudinal axis M of the missile, i.e. the heading, and $\theta_D$ is the angle between the datum and the line D along which the aerial system is pointing (i.e. the aerial boresight). Due to aberration caused by the radome 2, the radar receiver supplies an electric signal that is a measure of the apparent target/boresight angle, i.e. the angle $(\theta_{SA}-\theta_D)$ between the line D and the apparent sight line SA of the target although the true sight line S is at an angle $\theta_S$ to the datum. Sensors (indicated diagrammatically by the block 8) associated with the aerial system supply in known manner an electric signal that is a measure of the boresight/heading $(\theta_D-\theta_M)$ between the axis M and the boresight D.

Referring now to FIG. 2, the radome aberration correcting system effects the necessary corrections separately in the azimuth and elevation planes but only the apparatus for making the azimuth correction will be fully described since that for elevation correction is essentially the same. The analogue electric signal supplied by the radar receiver 11 and the sensor 8 in respect of the angles $\theta_{SA}-\theta_D$ and $\theta_D-\theta_M$ are passed to an adding circuit 13 that supplies an analogue electric signal that is a measure of the angle $\theta_{SA}-\theta_M$. The latter signal is quantised by means of an analogue-to-digital converter 14 which supplies parallel binary electric signals representing an N digit binary word. These binary signals together with similar binary signals supplied by the converter 15 are utilised to address a storage location within a read-only memory (ROM) 16 that is associated (to the accuracy of quantising) with a direction of the apparent sight line of a target relative to the longitudinal axis M of the missile.

At each location within the read-only memory 16 there is stored an n-digit binary word characterising the aberration ($\theta_S-\theta_{SA}$) in the azimuth plane introduced by the radome at the solid angle between the apparent target sight line and the missile's longitudinal axis that is associated with that location. Thus by addressing a particular location in the memory 16, as just described, binary electric signals representing $\theta_S-\theta_{SA}$ are supplied in parallel to a digital-to-analogue converter 17. The analogue signal supplied by the converter 17 has a level K ($\theta_S-\theta_{SA}$), where K is a constant, and this signal is passed to a scaling circuit 18 which supplies an electric signal having the level $\theta_S-\theta_{SA}$ (i.e. normalised to the level of the signal supplied by the receiver 11).

The signals which are supplied by the receiver 11 and the scaling circuit 18 and which represent the angles $\theta_{SA}-\theta_D$ and $\theta_S-\theta_{SA}$ respectively are passed to an adding circuit 19 which supplies an analoque electric signal having a level representing the angle $\theta_S-\theta_D$. This latter signal is utilised by the missile guidance system (not shown) in known manner.

Although not shown in FIG. 2, a sample-and-hold circuit is preferably provided between the adding circuit 13 and the analogue-to-digital converter 14 so that the analoque signal representing the angle $\theta_{SA}-\theta_M$ is periodically sampled and each sample in turn is passed to the converter 14. In this case, the performance of the aberration correction system may be improved by superimposing on to the signal supplied to the converter 14 a low amplitude jitter signal having a frequency considerably less than, say of the order of one tenth, the sampling frequency. Such a jitter signal effectively spreads out the abrupt changes in quantised amplitude thereby greatly reducing its effect in terms of overall 'noise'. The jitter signal may have a peak-to-peak amplitude of approximately one quantisation step and preferably has a triangular waveform but may alternatively be of sinusoidal or other non-rectangular waveform.

It will be appreciated that, due to manufacturing tolerances, it is necessary for the aberration information stored by the read-only memory 16 to be obtained by measurement of the radome with which it is to be used.

The stored n-digit binary words are derived from a test run on each individual radome following its manufacture. The radome is mounted for rotation about orthogonal axes and a radar signal is transmitted to a directional aerial system within it from a fixed and known position. The apparent direction of the transmitter is determined and stored against the known actual position for a whole range of azimuth and elevation attitudes of the radome. The error at each reading is determined and recorded and is then permanently associated with the particular radome.

The memory 16 may conveniently be a so-called "programmable read-only memory" (PROM) which permits the appropriate aberration information for a particular radome to be permanently written into the memory.

The aberration characteristics of a radome are, in general, frequency dependent. If therefore the homing head is required to operate at any one of a plurality of different radio frequencies, separate read-only memories (corresponding to the memory 16) may be provided within the homing head for each such frequency, the appropriate one being brought into use as required. Alternatively the read-only memory may be a plug-in item and the appropriate one may be fitted to the homing head immediately before launch of the missile when the operating frequency is known. If the homing head has only a single read-only memory of the programmable type, the appropriate aberration information may be transferred to it from a tape immediately before launch.

During use of the missile, the control of the aerial system is such that the angle ($\theta_{SA}-\theta_D$) between the apparent sight line and the direction in which the aerial system is pointing is kept small, usually less than 1°. Thus if some degradation of overall performance is acceptable, the read-only memory 16 may be addressed by digital signals representing the angle $\theta_D-\theta_M$. Such signals may be obtained by directly digitising the position of the aerial system relative to the missile body by electro-optical or other means so that the analogue-to-digital converter 14 is not then required.

Within the scope of the present invention, the read-only memory 16 may be replaced by a random access read/write memory (RAM) into which the appropriate aberration information is written when required.

Although the described embodiment of the invention has employed a mechanically steerable aerial system it will be clear that this is not essential to the invention. Thus a fixed array of aerial elements may be employed, deriving directional information from the relative phasing of the received signals at the various elements.

As an alternative to the monopulse arrangement of the aerial system described, conical scanning of the transmitted signal may be employed in known manner, directional information then being derived from the modulation thus imposed on the received signal.

The system described above is a semi-active system with a remote transmitter but the invention is equally applicable to an active radar system with both transmitter and receiver in the homing head.

We claim:

1. A radome aberration correction system having a directional aerial system and a radome enclosing said aerial system, the aberration correcting system comprising:

(A) an addressable digital data store storing predetermined information in respect of the direction-aberration imposed on radio waves received by said aerial system from different apparent directions so that predetermined aberration information is stored in association with different apparent directions, (B) means for detecting the apparent direction of a source of radio waves received by said aerial system, (C) means for addressing said data store with an address characteristic of said apparent direction to determine from the data store a predetermined stored value of direction-aberration associated with said apparent direction, and (D) means for adding said value of direction-aberration to said apparent direction to give the true direction of said source.

2. A system according to claim 1, wherein said data store is a read-only memory.

3. A system according to claim 1, wherein said data store is a random access read/write memory.

4. A system according to claim 1, wherein said aerial system is steerable, said correcting system comprising means providing a first signal characteristic of the angle in a fixed plane between the apparent direction of a target and the aerial direction, means providing a second signal characteristic of the angle in said plane between the aerial direction and the missile heading, means responsive to said first and second signals for providing a third signal characteristic of the angle between the apparent direction of the target and the missile heading, said third signal providing an address for accessing said data store and deriving therefrom a fourth signal characteristic of a particular direction aberration stored in said data store, and means responsive to said first signal and to said fourth signal to provide an output signal which is characteristic of the angle in said plane between the true target direction and the aerial direction.

5. A system according to claim 4 wherein said aerial system is mechanically steerable, said aerial direction being the aerial boresight.

6. A system according to claim 4, wherein said aerial system comprises a phased-array of aerial elements.

7. A system according to claim 4, and comprising an analogue-to-digital converter to which said third signal is applied to provide a digital address for said data store, and a digital-to-analogue converter to which the information read out from said data store is applied to provide an analogue correction for adding to said first signal.

8. A radio homing head for a missile, and including:

(A) a directional aerial system and a radome enclosing said aerial system, (B) an addressable digital data store storing predetermined information in respect of the direction-aberration imposed on radio waves received by said aerial system from different apparent directions so that predetermined aberration information is stored in association with different apparent directions, (C) means for detecting the apparent direction of a source of radio waves received by said aerial system, (D) means for addressing said data store with an address characteristic of said apparent direction to determine from the data store a predetermined stored value of direction-aberration associated with said apparent direction, and (E) means for adding said value of direction-aberration to said apparent direction to give the true direction of said source.

* * * * *